F. NEALE.
CABLE SUSPENSION TRANSPORTATION SYSTEM.
APPLICATION FILED NOV. 22, 1911.
1,041,506.
Patented Oct. 15, 1912.
4 SHEETS—SHEET 4.
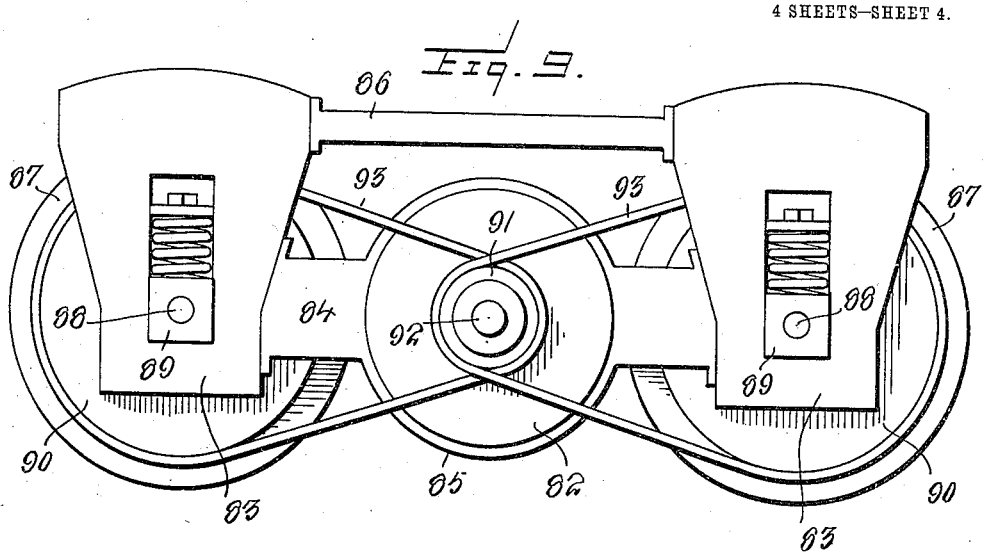
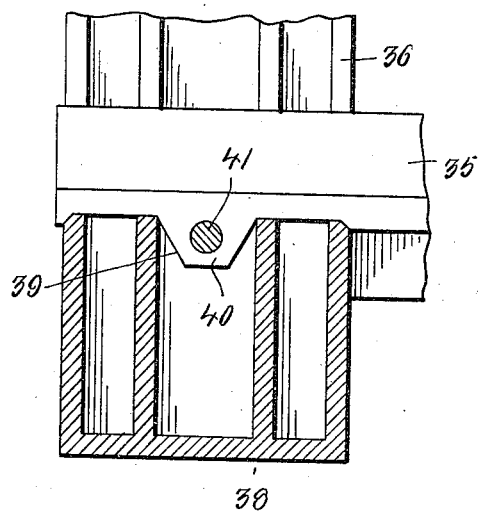
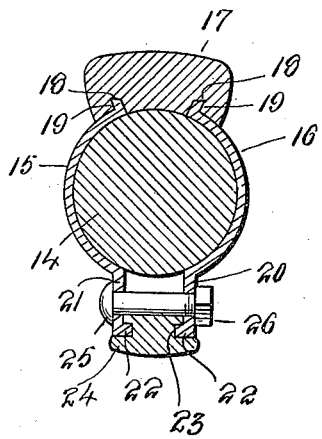
Witnesses
E. R. Rupfurt.
J. H. Antonega
Inventor
Frank Neale
By Victor J. Evans
Attorney

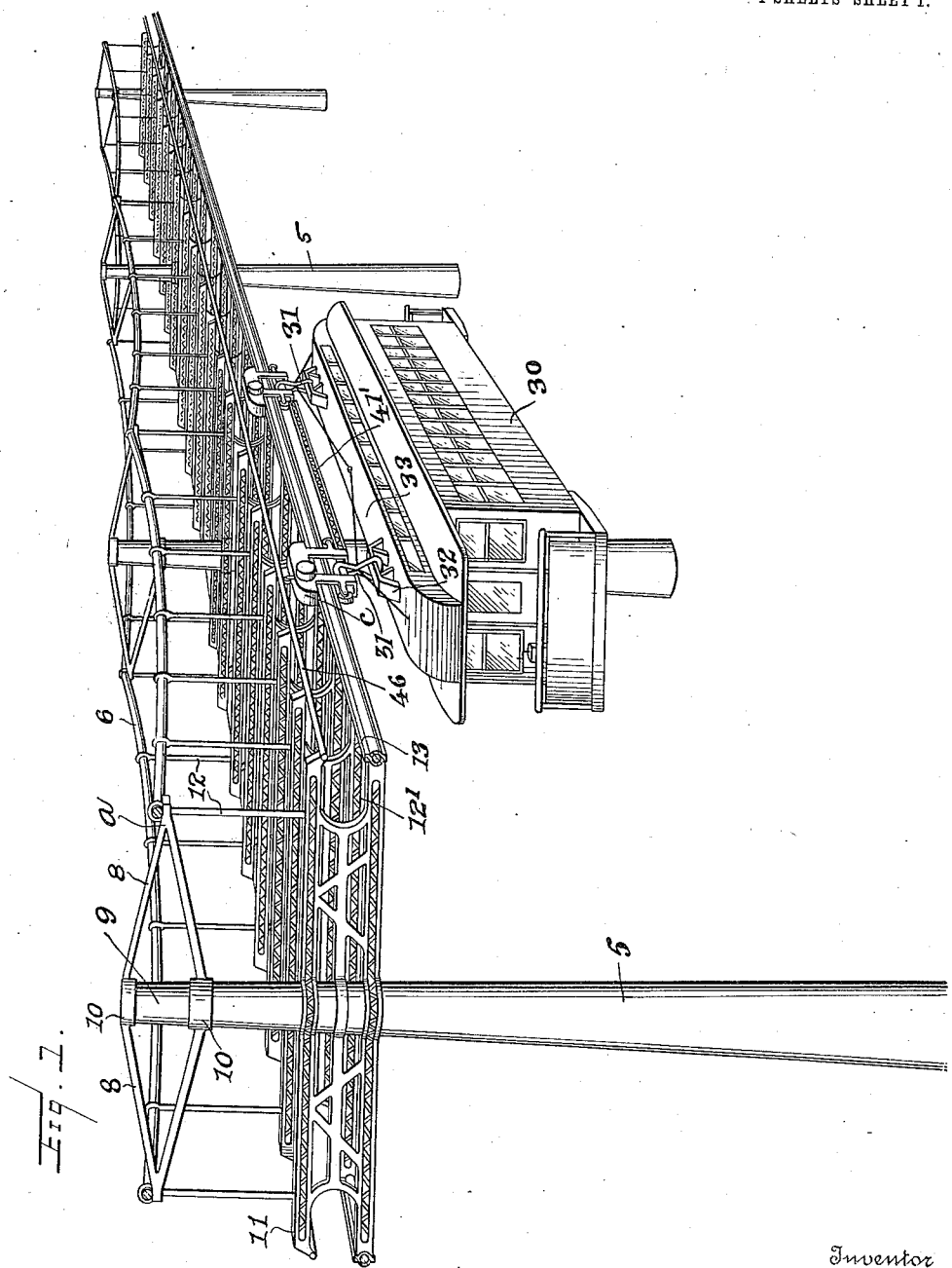

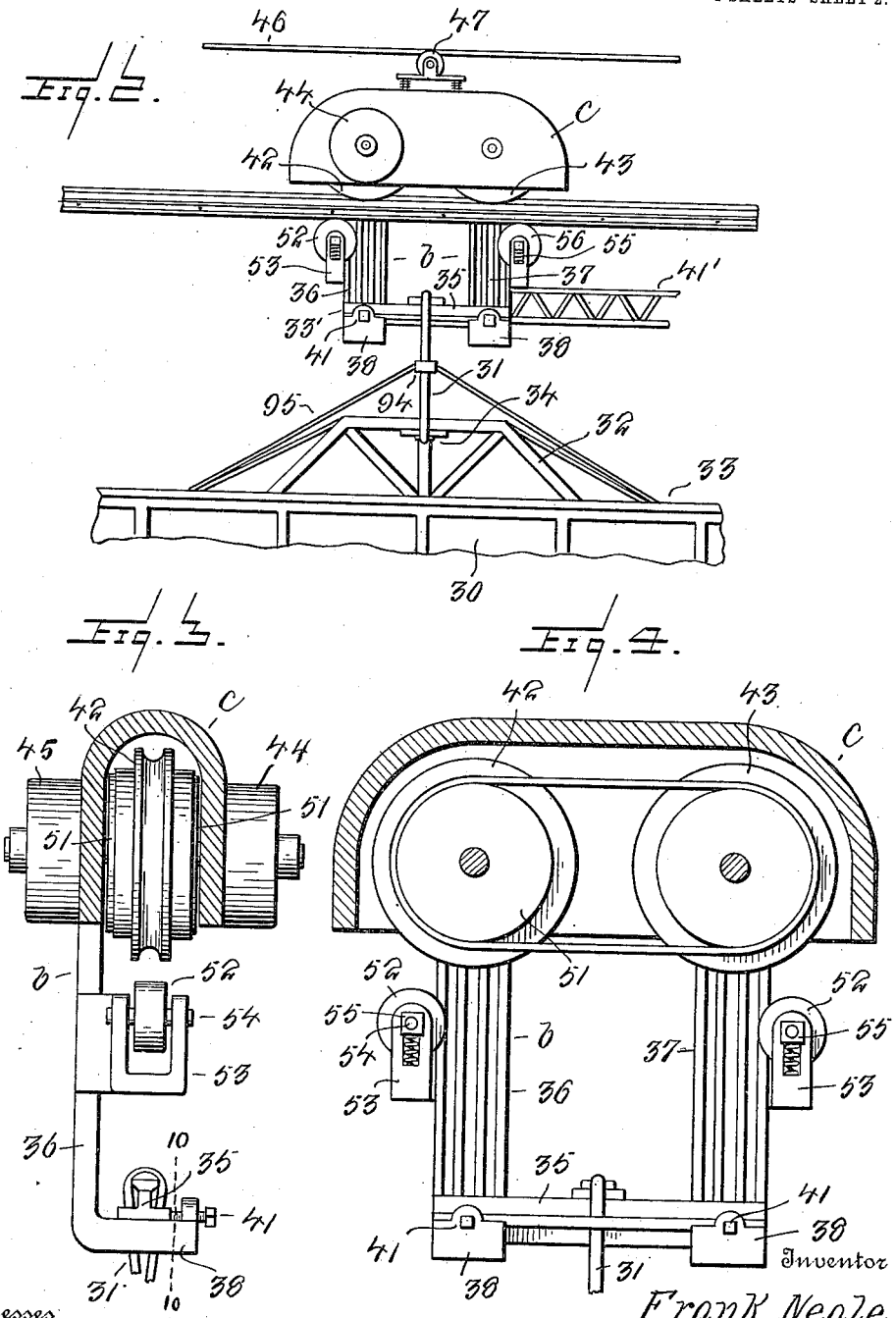

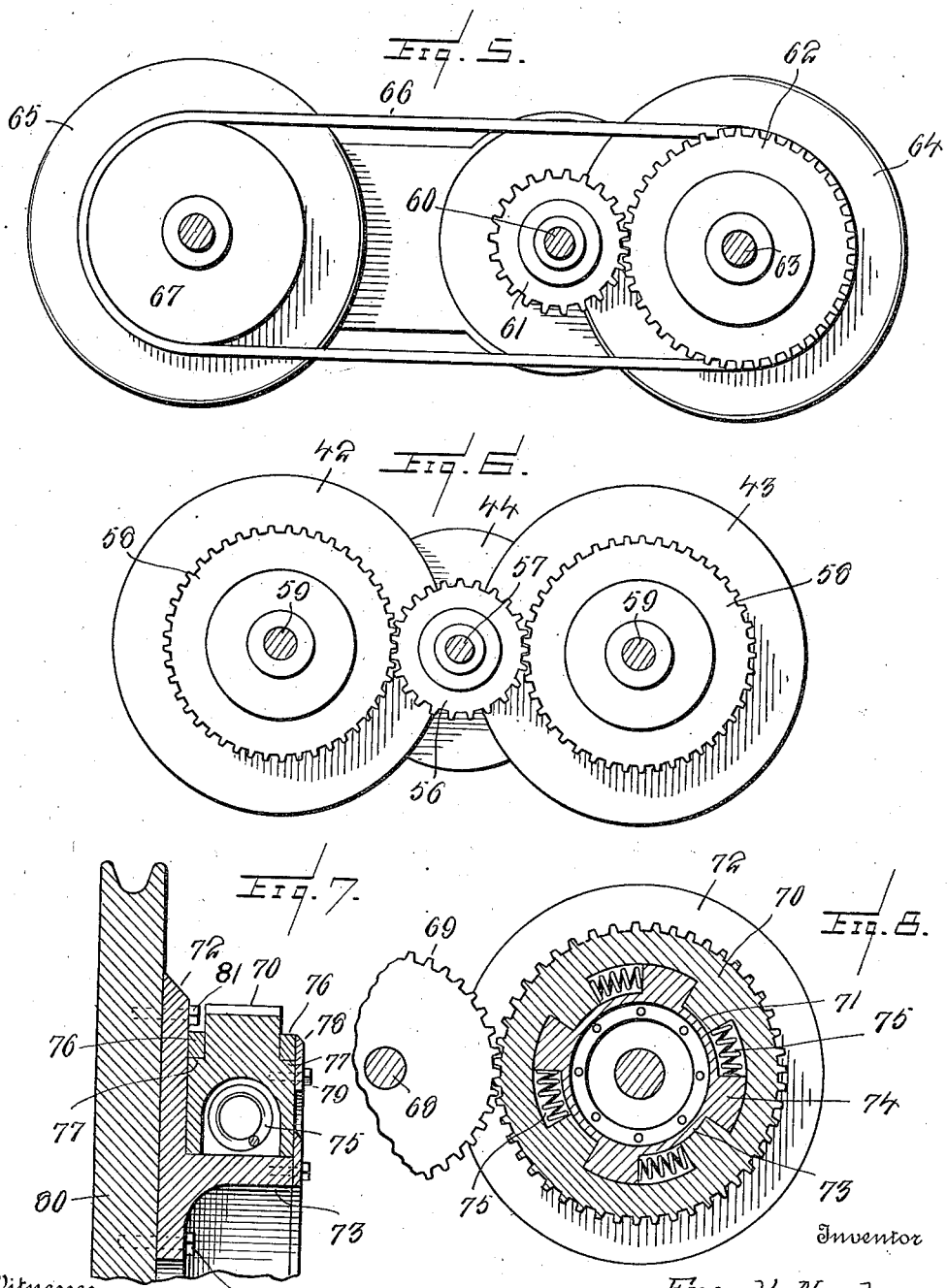

UNITED STATES PATENT OFFICE.

FRANK NEALE, OF HOOD RIVER, OREGON.

CABLE SUSPENSION TRANSPORTATION SYSTEM.

1,041,506.            Specification of Letters Patent.        Patented Oct. 15, 1912.

Application filed November 22, 1911. Serial No. 661,678.

*To all whom it may concern:*

Be it known that I, FRANK NEALE, a citizen of the United States, residing at Hood River, in the county of Hood River and State of Oregon, have invented new and useful Improvements in Cable Suspension Transportation Systems, of which the following is a specification.

The general object of the invention is to improve the character of "cable suspension transportation system" of the monorail type as shown in Letters-Patent granted me under the date of March 21, 1911, numbered 987,253.

Other objects will appear and be better understood from the following description taken in connection with the accompanying drawings in which:—

Figure 1 is a perspective view of the system. Fig. 2 is a detail side elevation of one of the trucks. Fig. 3 is an end elevation of the same, the housing or casing being shown in section. Fig. 4 is an enlarged vertical longitudinal sectional view of the truck illustrated in Fig. 2. Fig. 5 is a sectional view showing a slightly modified form. Fig. 6 is a similar view of a still further modification. Fig. 7 is a fragmentary transverse sectional view of a still further modification. Fig. 8 is a fragmentary vertical longitudinal section view of the modified form illustrated in Fig. 7. Fig. 9 is a side elevation of one of the trucks, illustrating another modification. Fig. 10 is a sectional view on the line 10—10 of Fig. 3. Fig. 11 is a transverse sectional view of one of the tracks.

Referring to the accompanying drawings and more particularly to Fig. 1, it will be seen that the invention comprises a plurality of piers or supports 5 arranged at suitable distances apart along the route. The supports 5 may be made of any material found suitable for the purpose and may be of various lengths so that when they are secured in the ground, the bed of a stream, or to any other suitable base or foundation, the cars, which they support by means of various connections hereinafter described, will run at a suitable distance above the ground. The main supporting cables 6 are connected to or bear upon any suitable portions of the supports 5.

The main hangers *a* are supported directly by the piers 5 and each hanger includes an upper member 8 having a portion 9 thereof provided with a socket adapted to receive the upper end of one of the piers and bearing members 10 at either end of the pier receiving portion 9 to bear on the sides of said pier. The lower member 11 is sustained from the upper member 8 by means of cables 12 which are connected at their upper ends to the main supporting cables 6. The member 11 is provided at its ends with passage-ways 12' in the lower sides of which are seats for the tracks 13, said tracks being clearly illustrated in Fig. 11. Each track includes a cable 14 and a casing therefor made up of sections 15 and 16. A tread plate 17 has grooves 18 in the underside thereof which receive shoulders 19 at one end of the sections 15 and 16, the opposite ends of said sections having extending cheek plates 20 and 21 terminating in inturned flanges 22 which are received by lateral grooves 23 formed in a tread plate 24. Clamping elements 25 extend through the cheek plates 20 and 21 which coöperate with the nuts 26 to draw said cheek plates together, this having the effect of moving the shouldered end portions of the sections 15 and 16 outwardly so as to bind on the side walls of the grooves 18. With this construction it will be seen that the cable 14 is protected against wear, while the tread plates 17 and 24 provide smooth running surfaces for the wheels of the trucks hereinafter described.

The car 30 may be of any suitable construction and is supported adjacent its opposite ends by means of flexible loops 31 which engage suitable brackets 32 of the roof 33 of the car and extend through grooved seats 34 carried by the brackets 32. The loops also embrace the cross arm 35 of the supporting frames *b*, the sides of which are designated by 36 and 37 having shoulders 38 to form bearing surfaces for the said cross arm 35, the latter being so constructed and coöperating with the shoulders 38 to prevent lateral or longitudinal displacement of said cross arm. This lateral or longitudinal movement is prevented by forming grooves 39 in the shoulders 38 to receive projections 40 carried by the cross arms 35. Adjusting screws 41 which engage the said shoulders, and the projections 40 serving, when turned, to move the cross arms 35 laterally for a purpose hereinafter described.

The supporting frames *b* may be connected in any suitable manner such as by a stringer 41', the frames being suitably connected to or formed integral with one side of the truck casing *c*. Mounted in the casing *c* are the sheaves 42 and 43.

In the form illustrated in Figs. 2, 3 and 4, the sheaves 42 and 43 of each truck are mounted directly upon the shafts turned by the motors 44 and 45 respectively, the power of the latter being supplied by a feed wire 46 carried by the member 11 and through a trolley wheel 47 connected to one of the motors. A suitable pulley 51 is formed integral with or otherwise secured to the sheave 42 and a belt connection is established between the pulley 51 and a similar pulley on the sheave 43. The guard wheels 52 are carried by brackets 53 connected to the sides 36 and 37 of the frames *b*, said guard wheels being adapted to bear on the tread plate 24 of the track, the tread plate 17 of said track being adapted to form a bearing for the sheaves 42 and 43. The shafts 54 of the guard wheels 52 are arranged in the spring pressed blocks 55 in the bracket 53, this structure having the effect to compensate for any irregularities in the tread surfaces of the sheaves and guard wheels.

In the form illustrated in Fig. 5, the motor shaft 60 has a toothed pinion 61 which meshes with a gear wheel 62 secured to the shaft 63 to which the sheave 64 is secured and a belt and pulley connection 66 and 67 is established for the purpose of driving the sheave 65.

In the form illustrated in Fig. 6, a motor 44 is arranged between the sheaves 42 and 43 and connected to a pinion 56, on the motor shaft 57, to gear wheels 50 secured on the shafts 59 of the sheaves 42 and 43.

In the form illustrated in Figs. 7 and 8 the motor shaft 68 has a toothed pinion 69 which meshes with the gear wheels 70 which have radial projections 71. A casting 72 has a hub or extension 73 provided with radial extensions 74 which are received by the spaces between the projections 71 of the gear wheels 70, compression springs 75 being also arranged in said spaces and bearing on the extensions 71 and 74. The rings 76 embrace circular shoulders 77 on the gear wheels 70 and bear on the lateral faces of the projections 71 and 74 and retaining rings 78 bear on the outer rings 76 and are secured by bolts 79 which engage the gear wheels 70 and casting 72. With this construction it will be seen that the initial turning movement of the gear wheels 70 will be cushioned by the springs 75, that is to say that when the gear wheels turn so as to compress said springs. This will have the effect of absorbing the shock at the beginning of the movement of the car. The castings 72 are additionally secured to the sheaves 80 by means of bolts 81 passing through the body of said castings and sheaves.

In the form illustrated in Fig. 9 the motor 82 is arranged between the journal boxes 83 of the truck. A cross piece 84 has a portion 85 thereof adapted to form a frame for the motor 82 and is connected to the journal boxes 83, the latter being additionally connected by means of a cross piece 86 arranged above the cross piece 84. The sheaves 87 have their shafts 88 arranged in spring pressed blocks 89 which are slidable in the journal boxes 83. Pulleys 90 are suitably connected with the shafts 87 and pulleys 91 are connected with the motor shaft 92, said pulleys 90 and 91 being connected by means of belts 93.

It will be seen that by means of the cross arms 35 that the car and trucks may be adjusted relatively to each other in order to have the centers of gravity in vertical alinement. The loops 31 are contracted at their middle portions and secured by clamps 94 and suitable guys for braces 95 connect the supporting loops 31 with the roof 33 of the car and serve to prevent excessive longitudinal swinging movement of the car in addition to bracing the structure. By the provision of the flexible loops the ordinary swivel connection heretofore employed for permitting relative turning movement between the trucks and car on rounding curves is eliminated, since, with the construction employed, the necessary amount of relative turning movement is permitted when the car is rounding a curve. It will also be observed that the passage-ways 12' and the lower member 11 of the hangers will afford clearances for the motors as the trucks move along the track 13.

Although there have been shown and described a preferred and several modified forms of my invention it is to be understood that the invention is not to be limited to the specific structure herein shown and described, nor to the particular arrangement of the parts since it will be manifest that various changes will be made, within the scope of the appended claims without departing from the spirit or sacrificing any of the advantages of the invention.

What is claimed is:—

1. A cable suspension transportation system comprising a track, trucks including wheels adapted to run on said track, a car, and a laterally adjustable connection between said car and each of said trucks.

2. A cable suspension transportation system comprising a track, car trucks including grooved wheels adapted to run on said track, a car, a supporting frame connected to each truck and having a lateral bearing, a laterally adjustable cross arm slidably mounted in said bearing, and a connection between said car and said cross arm.

3. A cable suspension transportation system comprising a track, trucks including wheels adapted to run on said track, a car, a supporting frame connected to each truck, a laterally adjustable cross arm slidably connected to each of said frames, and a connection between said car and said cross arm.

4. In a cable suspension transportation system, the combination with a support and a track; of a truck including wheels adapted to run on the upper surface of said track, a casing for said truck, a supporting frame depending from said casing, a cross arm adjustably carried by said frame, and yieldable means carried by said frame and engaging the lower surface of said track.

In testimony whereof I affix my signature in presence of two witnesses.

FRANK NEALE.

Witnesses:
T. S. SAUNDERS,
JOSEPH B. MOSSMAN.

Copies of this patent may be obtained for five cents each, by addressing the "Commissioner of Patents, Washington, D. C."